United States Patent [19]

King et al.

[11] Patent Number: 5,402,712
[45] Date of Patent: Apr. 4, 1995

[54] MOTORIZED ASSIST FOR RAISING AND LOWERING THE LID OF A LARGE CAPACITY PRESSURE COOKER

[75] Inventors: James D. King, Dayton; Stephen D. Werts, Eaton, both of Ohio

[73] Assignee: Henny Penny Corporation, Eaton, Ohio

[21] Appl. No.: 317,219

[22] Filed: Oct. 3, 1994

Related U.S. Application Data

[63] Continuation of Ser. No. 69,099, May 28, 1993, abandoned.

[51] Int. Cl.[6] .............................................. A47J 37/12
[52] U.S. Cl. ........................................ 99/407; 99/404; 99/415
[58] Field of Search ............... 99/407, 329 P, 416, 99/403, 404, 410, 408, 415, 418, 455; 366/286, 203, 204, 195, 196; 212/152; 160/84.1

[56] References Cited

U.S. PATENT DOCUMENTS

| | | |
|---|---|---|
| 3,061,279 | 10/1962 | Reed . |
| 3,187,664 | 6/1965 | Jennings ............... 99/329 |
| 3,501,316 | 3/1970 | Guthrie, Sr. ............ 99/107 |
| 3,563,158 | 2/1971 | Omer .................. 99/326 |
| 3,608,472 | 9/1971 | Pelster ................ 99/327 |
| 3,635,722 | 1/1972 | Moore ................. 99/107 |
| 3,690,246 | 9/1972 | Guthrie, Sr. ............ 99/336 |
| 3,821,925 | 7/1974 | Moore ................. 99/37 |
| 4,560,074 | 12/1985 | Manning .............. 212/152 |
| 4,930,408 | 6/1990 | King et al. ............ 99/407 |
| 5,195,569 | 3/1993 | Peterson et al. ........ 160/84.1 |

OTHER PUBLICATIONS

PCT/DK90/00268, WO 91/06221 Ice-Cream Machine with Rotating Mixing Member 16 May 1991.

*Primary Examiner*—David A. Scherbel
*Assistant Examiner*—Reginald L. Alexander
*Attorney, Agent, or Firm*—Frost & Jacobs

[57] ABSTRACT

A motor driven assembly to assist in the raising and lowering of the lid of the vat of a large capacity pressure cooker. The assist assembly comprises a vertically oriented support frame secured to the rear of the pressure cooker housing. The support frame comprises a pair of vertical, inwardly opening, U-shaped guide rails joined together by top and bottom horizontal support frame members. The front, rear, sides and top of the support frame are enclosed by panel members completing the overall housing of the pressure cooker. A vertically oriented, frame-like carriage is mounted within the support frame. The carriage has rollers received within the support frame guide rails and is vertically shiftable within the support frame. The carriage mounts a pair of horizontal arms which extend through vertical slots in the pressure cooker housing and which support the vat lid. The top frame member of the support frame carries a drum which is driven by an electric motor. At least one cable has one of its ends attached to the drum and the other of its ends attached to the carriage, enabling the motor and drum to raise and lower the carriage within the frame, thereby shifting the vat lid between open and closed positions.

9 Claims, 4 Drawing Sheets

MOTORIZED ASSIST FOR RAISING AND LOWERING THE LID OF A LARGE CAPACITY PRESSURE COOKER

This is a continuation of application Ser. No. 08/069,099, filed May 28, 1993, now abandoned.

TECHNICAL FIELD

The present invention is directed to a large capacity pressure cooker, and more particularly to a motorized assist for raising and lowering the lid of the cooker vat.

BACKGROUND ART

A large capacity pressure cooker generally comprises a vat or cooking vessel of a size to receive a wire basket in which the product to be cooked is located. The basket is thereafter immersed in the cooking oil contained in the vat. The vat is closed by a lid which makes a seal with the top of the vat. The product is cooked for the desired length of time under both heat and pressure. Following the cooking cycle, the pressure in the vat is relieved and the lid is opened, whereupon the product is removed from the wire basket. Exemplary large capacity pressure cookers of the type to which the present invention is directed are illustrated and described in U.S. Pat. Nos. 4,930,408 and 4,997,101. During the cooking operation, when the vat is pressurized, it is imperative that the vat lid be firmly closed and locked, as a matter of safety. The above-identified references teach locking mechanisms suitable for this purpose.

A problem arises from the fact that the vat lid must be of heavy construction to properly and safely withstand the pressure within the vat during the cooking cycle. To overcome this problem, prior art workers have devised various types of automatic mechanisms for opening and closing the vat lid. Vertically shiftable rod means for raising and lowering the lid are taught in U.S. Pat. No. 3,187,664. U.S. Pat. No. 3,608,472 is exemplary of a number of patents teaching the use of jack screws or the like. U.S. Pat. No. 3,821,925 teaches the use of a geared bar or rack-like system. U.S. Pat. No. 3,563,158 describes hydraulic cylinders used to raise and lower the vat lid. In some instances, these various mechanisms are used to additionally hold the lid down in place during the pressurized operation of the cooker.

Some of the prior art lid raising and lowering mechanisms required powerful power train means. Many of them required that the lid actuating mechanism be located at the sides or about the vat making access to the vat and cleaning operations more difficult. Many of the electro-mechanical or hydraulic systems used for this purpose have been characterized by maintenance problems and attendant down-time. Some are sufficiently complex as to require a skilled operator. As a result, efforts to mechanize the operation of large capacity pressure cookers by means of electro-mechanical or hydraulic controls for raising and lowering the lids of the vats have produced more problems than they have solved.

U.S. Pat. No. 4,930,408 teaches a different approach. In accordance with this reference, the lid is provided with a substantial locking mechanism to maintain the lid in its seated, closed position during that part of the cooking cycle in which the vat is pressurized. The vat lid is raised and lowered manually, but is provided with a counterbalance system so that the operator need not contend with the full weight of the lid. While this system works well, it still requires some strength on the part of the operator and is more difficult for the smaller operator to handle.

The motorized assist assembly of the present invention uses a cable operated by an electric motor driven cable drum. The motorized assist assembly of the present invention is simple in construction and inexpensive to manufacture. The motorized assist assembly is located at the rearward end of the pressure cooker housing and does not interfere with access to the vat or cleaning of the vat and lid. The assist assembly is very simple to operate and does not require a skilled operator. A safety arrangement of the actuating means for the assist assembly, assuring against injury of the operator, can be employed, as will be described hereinafter.

DISCLOSURE OF THE INVENTION

According to the invention there is provided a motor-driven assembly to assist in the raising and lowering of the lid of the vat of a large capacity pressure cooker. The assembly comprises a support frame vertically oriented and secured to the rearward end of the pressure cooker. The support frame comprises a pair of vertical guide rails of U-shaped cross-section opening toward each other. The guide rails are joined together at their upper and lower ends by top and bottom horizontal frame members. The front, rear, sides and top of the support frame is enclosed by stainless steel panels comprising a part of the overall cabinet of the pressure cooker. A frame-like carriage is mounted vertically within the support frame and is provided with rollers received within the support frame guide rails, rendering the carriage vertically shiftable within the support frame. A pair of horizontal arms is affixed to the carriage. The arms extend forwardly of the pressure cooker through vertical slots in the stainless steel panel covering the front of the support frame. The pressure cooker vat lid is mounted on the arms.

A drum, driven by an electric motor, is mounted on the top frame member. A pair of cables is provided, each cable having one end attached to the drum and the other end attached to the carriage. One of the cables is slightly longer than the other and does not bear the weight of the carriage, serving as a back-up cable should the other cable fail. The drum is rotatable in a first direction by the electric motor to raise the carriage vertically within the support frame, raising the carriage arms and the vat lid therewith. The drum is rotatable in an opposite direction by the electric motor to lower the carriage within the support frame, lowering the arms and lid therewith. In this manner the lid of the pressure cooker is shifted between its lower position seated upon the vat and an open upper position. Safety control means are provided for energizing the electric motor, as will be described hereinafter.

DETAILED DESCRIPTION OF THE INVENTION

While not intended to be limiting, for purposes of an exemplary showing the motorized assist assembly of the present invention will be described in its application to the large capacity pressure cooker taught in the above-mentioned U.S. Pat. No. 4,997,101.

Figure 1:
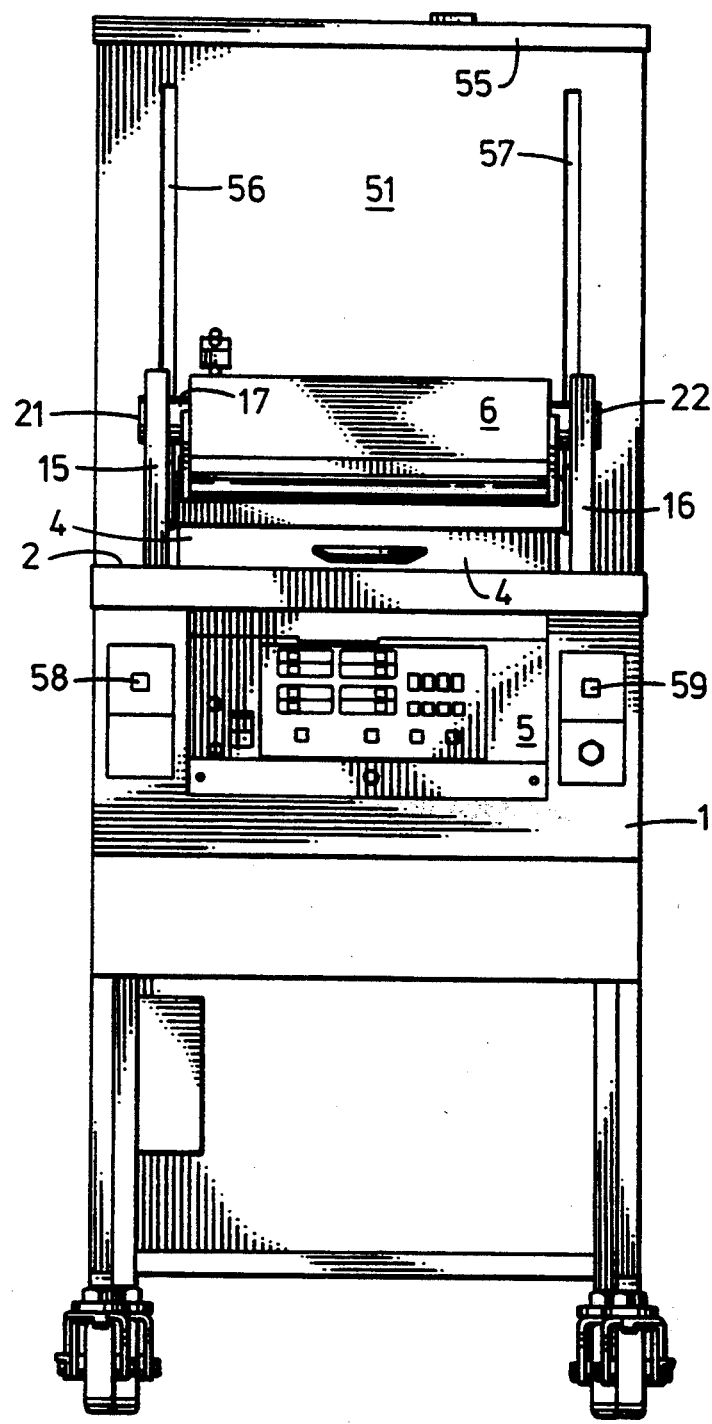
FIG. 1 is a from elevational view of a large capacity pressure cooker provided with the motorized assist of the present invention.
Figure 2:
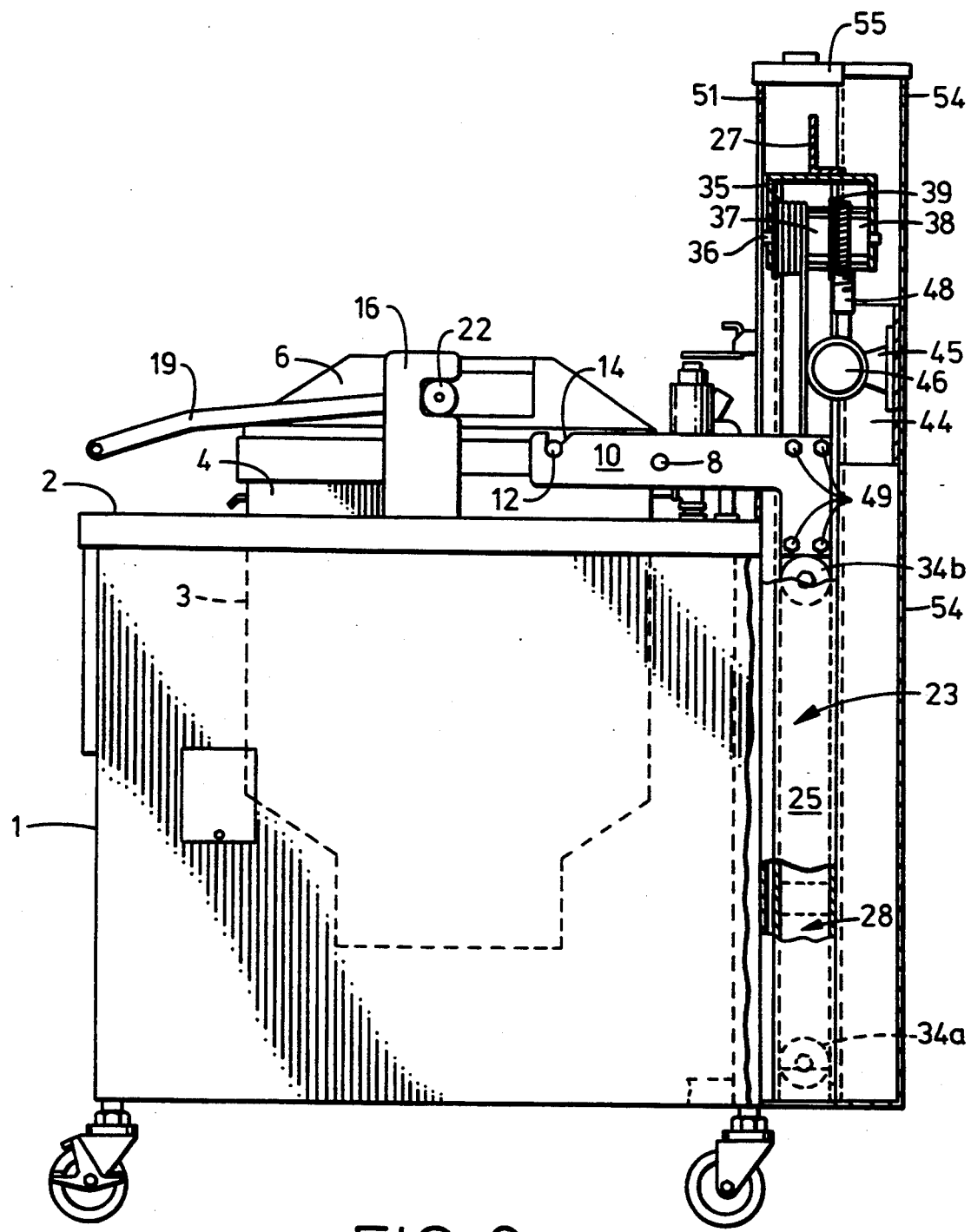
FIG. 2 is a right side elevational view of the pressure cooker of FIG. 1, partly in cross-section.

Referring first to FIGS. 1 and 2, the large capacity pressure cooker comprises a generally rectangular housing 1 having an upper surface 2 at essentially table-top height. The housing 1 encloses a rectangular cooking vat indicated in broken lines at 3 in FIG. 2. The upper end of the vat 3 terminates in an open top 4 which projects upwardly above the surface 2. A control module 5 is located in the front wall of housing 1 for controlling the various functions of the pressure cooker.

The open top 4 of the vat 3 is adapted to be closed by a lid 6, generally formed of cast aluminum. The lid 6 has a pair of integral cast perforated lugs 7 and 7a journaled on a shaft 8 (see FIG. 4). The ends of shaft 8 are received in perforations in a pair of parallel spaced lid supporting arms 9 and 10. The integral, rearwardly extending lid lugs 7 and 7a, together with the shaft 8, form a hinge by means of which the lid 6 may be pivoted from a horizontal position (as shown in the Figures) to a vertical position for purposes of cleaning. The lid 6 is provided with a pair of laterally extending studs 11 and 12. The lid 6 is normally maintained in a horizontal position by means of studs 11 and 12 engaged in upwardly opening slots 13 and 14 in the lid mounting arms 9 and 10, respectively.

Lid 6 is shiftable vertically between a closed position (as shown in the Figures) and an elevated open position. The lid 6 is provided with a gasket (not shown) which is adapted to engage the upper open end 4 of vat 3 when the lid 6 is in its closed position. The lid is provided with a locking mechanism assuring that the lid is tightly sealed to the open end of the vat during the cooking cycle wherein the vat is pressurized. The locking mechanism is described in detail in the above-noted U.S. Pat. No. 4,997,101. Very briefly, a pair of hook arms 15 and 16 extend upwardly from surface 2 at either side of the upper end 4 of the vat 3. A cam bar 17 is mounted on and extends transversely of the vat lid 6. The cam bar 17 is provided with forwardly extending arms 18 and 19 joined by a bar 20 comprising a handle in parallel spaced relationship to the cam bar 17. The ends of the cam bar 17 support rollers 21 and 22 receivable within the slots of hook arms 15 and 16, respectively. The cam bar is manually shiftable longitudinally of lid 6 between a forward lid locking position and a rearward unlocking position. In its forward lid locking position, the cam bar 17 assumes a over-center orientation with its rollers 21 and 22 bearing upwardly against the upper surfaces of the slots of hook arms 15 and 16, and the main portion of the cam bar bearing downwardly against the lid 6.

The under side of lid 6 is provided with hangers (not shown) adapted to detachably receive a carrier (not shown) for the support of wire product-carrying baskets or trays, as is well known in the art. Each tray is filled with product to be cooked and then is inserted in the carrier from the front of the cooker. When the lid 6 is shifted from its elevated open position to its closed position, the product-filled trays are lowered into the vat 3. The carrier for the trays may be readily removed from the lid for cleaning purposes, or when it is desired to clean the lid, itself.

It will be understood by one skilled in the art that the cooker will have a number of additional elements such as heating means for the vat 3, a collection tank for spent cooking oils, various valve means and the like. The pressure cooker will also have various safety devices such as means to prevent unlatching of the lid while the vat is pressurized. These elements are known in the art and are not further discussed herein since they do not constitute a part of the present invention.

Figure 3:
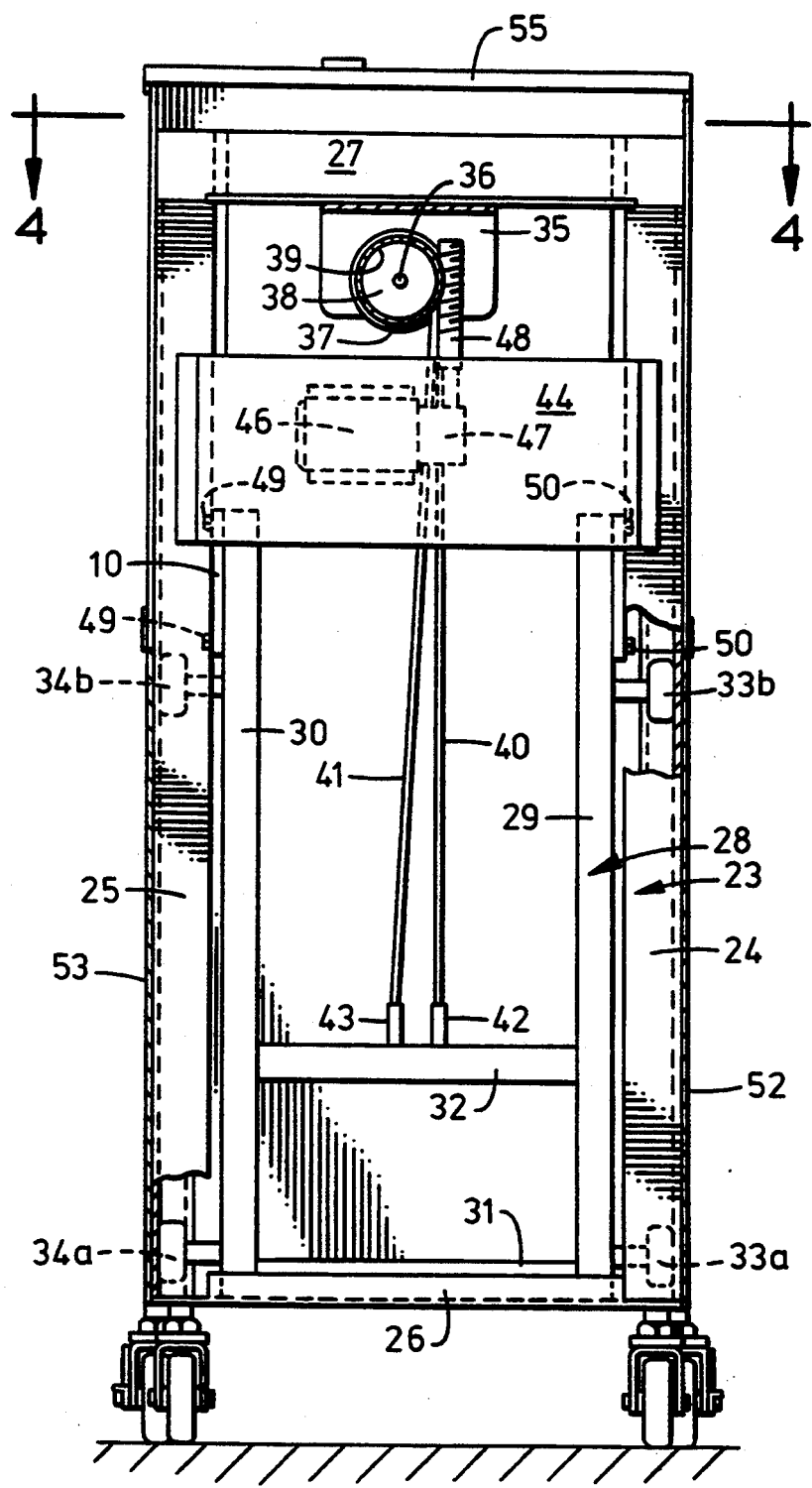
FIG. 3 is a rear elevational view of the pressure cooker of FIG. 1, with the covering panel removed to expose the assist assembly of the present invention.
Figure 4:
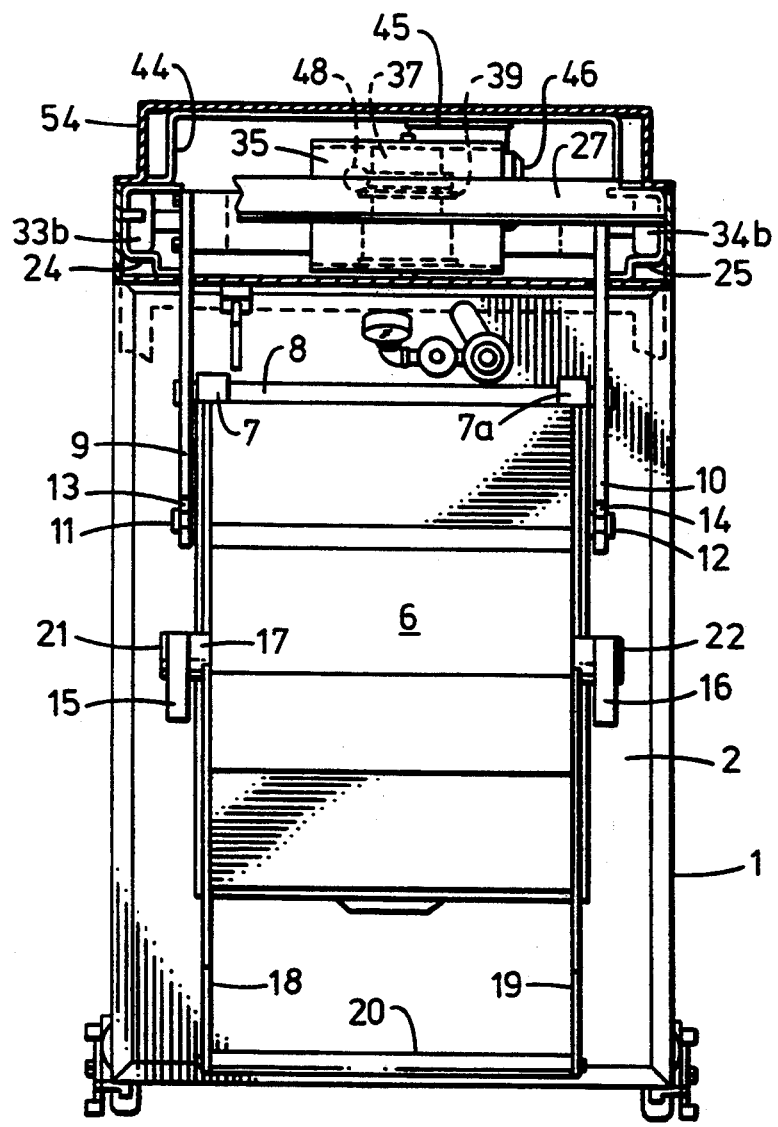
FIG. 4 is a cross-sectional view taken along section line 4—4 of FIG. 3.

The motorized assist assembly for raising and lowering vat lid 6 is most clearly shown in FIGS. 2, 3 and 4. The assembly comprises a vertically oriented support frame, generally indicated at 23. The support frame 23 is appropriately mounted to the rearward end of housing 1. Support frame 23 comprises a pair of vertical guide rails 24 and 25. As can be most clearly seen in FIG. 4, the guide rails 24 and 25 are generally U-shaped in cross-section and open toward each other. Guide rails 24 and 25 are joined together at their lowermost ends by a horizontal bottom frame member 26. The guide rails 24 and 25 are joined at their upper ends by a horizontal frame member 27. The frame member 27 may take the form of an angle iron, as is most clearly shown in FIG. 2.

Mounted within support frame 23 there is a vertically oriented carriage, generally indicated at 28. Carriage 28 comprises a frame-like member having a pair of vertical frame elements 29 and 30 and a pair of horizontal frame members 31 and 32. The vertical frame members 29 and 30 of carriage 28 are each provided with a pair of rollers 33a–33b and 34a–34b. The rollers 33a and 33b are received within guide rail 24. Similarly, the rollers 34a and 34b are received within guide rail 25. As a result of this construction, the carriage 28 is vertically shiftable within and with respect to the support frame 23.

The upper support frame horizontal member 27 has a generally U-shaped bracket 35 affixed thereto. The bracket 35 mounts a shaft 36. The shaft 36, in turn, supports a rotatable cable drum 37. Cable drum 37 has an extended portion 38 to which a helical gear 39 is affixed. The elements 35, 36, 37, 38 and 39 are most clearly shown in FIG. 2.

Referring to FIG. 3, the motorized assist assembly also includes a pair of cables 40 and 41. The upper ends of cables 40 and 41 are appropriately attached to cable drum 37. The lower ends of cables 40 and 41 are appropriately attached, as at 42 and 43 respectively, to the carriage horizontal frame member 32.

The rearmost legs of U-shaped guide rails 24 and 25 have a generally U-shaped bracket 44 affixed thereto. Bracket 44 supports a motor mount 45 to which an electric motor 46 is affixed. This is most clearly shown in FIGS. 2 and 3. Electric motor 46 supports a gear box 47 through which the electric motor 46 drives a laterally extending worm gear 48. The worm gear 48 is meshed with the helical gear 39 mounted on the extension 38 of cable drum 37. Electric motor 46, via gear box 47, worm gear 48 and helical gear 39 is capable of driving drum 37 both in a clockwise direction and a counterclockwise direction (as viewed in FIG. 3).

Lid mounting arm 10 is affixed by bolts 49 to the upper end of the vertical carriage frame member 30. This is clearly shown in FIGS. 2 and 3. In a similar fashion, lid mounting arm 9 is attached to the upper end of the carriage vertical frame member 29 by bolts 50.

Turning to FIG. 3, it will be evident that if electric motor 46 causes rotation of drum 37 in a counterclockwise direction (as viewed in FIG. 3), cables 40 and 41 will be wound upon the drum 37 and the carriage 28 will be caused to shift upwardly within support frame 23. Upward movement of carriage 28 will result in upward movement of mounting arms 9 and 10 together with vat lid 6. Safety means may be provided to turn off electric motor 46 when the lid 6 reaches its elevated open position.

Thereafter, operation of electric motor 46 in such a manner as to cause the drum 37 to rotate in a clockwise direction (as viewed in FIG. 3) will cause the cables 40 and 41 to pay off the drum 37, resulting in a downward movement of carriage 28, mounting arms 9 and 10, together with vat lid 6. The weight of these elements will assure such downward movement. Again, safety means may be provided to shut off motor 46 when the lid 6 reaches its lowermost closed position.

Cable 41 is slightly longer than cable 40. Cable 41 normally does not bear the weight of carriage 28, mounting arms 9 and 10, and lid 6. Cable 41 serves as a back-up, should cable 40 fail.

The entire motorized assist assembly is preferably enclosed in a cabinet of stainless steel or the like constituting a continuation of housing 1. To this end, the motorized assist assembly is illustrated as being enclosed behind a front panel element 51, side panel elements 52 and 53, a rear panel element 54 and a top panel element 55. It will be noted from FIG. 1 that the front panel element 51 is provided with vertical slots 56 and 57 accommodating the vertical movement of mounting arms 9 and 10.

The electric motor 46 may be actuated by the operator in any appropriate manner. For example, the panel 5 could be provided with an operating switch enabling the operator to actuate the motor 46 and drive drum 37 in the desired direction. For purposes of an exemplary showing, the pressure cooker is illustrated in FIG. 1 as having a pair of actuating switches 58 and 59. The circuitry is such that both switches 58 and 59 must be actuated in order to activate motor 46. The switches 58 and 59, themselves, are preferably of the type which must be manually held in actuated position, going to a neutral position if released. As a result of this arrangement, in order for the operator to activate motor 47, it is required that both hands be used throughout the activation of motor 47. This will assure that the operator's hands will be safe from injury due to movement of lid 6, particularly from its open position to its closed position.

Modifications may be made in the invention without departing from the spirit of it.

What is claimed:

1. A motorized assist assembly for raising and lowering the lid of a large capacity pressure cooker, said assembly comprising a large capacity pressure cooker having a housing with an upper surface, a cooking vat mounted within said housing and having an open upper end projecting upwardly from said housing upper surface, means within said housing to heat said vat, a lid for said vat, said lid being shiftable between an upper horizontal open position and a lower horizontal closed position, means mounted within said lid for sealingly engaging said vat upper end, latch means on said lid and said housing for locking said lid in said closed position, a pair of parallel horizontal arms to either side of and supporting said lid, said housing having sides, and forward and rearward ends, a vertically oriented rectangular framework affixed to said housing rearward end, a portion of said rectangular framework extending above said housing upper surface, said framework comprising a pair of vertical guide rails joined at their top and bottom ends by upper and lower horizontal frame members respectively, a vertically oriented carriage mounted within said framework, said carriage having vertical sides, rollers mounted on said carriage sides and engaging said vertical guide rails of said framework, said carriage being shiftable vertically within said framework, said lid supporting arms being affixed to said sides of said carriage, motorized means comprising a first bracket affixed to said upper horizontal frame member, a cable drum rotatively supported by said bracket, a gear affixed to said cable drum, at least a first cable having a first end affixed to said cable drum and a second end affixed to said carriage, a second bracket mounted on said framework, an electric motor affixed to said second bracket, a worm gear connected through a gear box to said motor, said worm gear being meshed with said cable drum gear whereby rotation of said cable drum in one direction by said electric motor will wind said first cable on said cable drum raising said carriage, said arms and said lid to said open position of said lid, and rotation of said cable drum in an opposite direction by said electric motor will unwind said first cable from said drum lowering said carriage, said arms and said lid to said closed position of said lid.

2. The motorized assist assembly claimed in claim 1 including a second cable having a first end affixed to said drum and a second end affixed to said carriage, said second cable being slightly longer than said first, whereby said second cable is non-load bearing and serves as a back-up cable in case of failure of said first cable.

3. The motorized assist assembly claimed in claim 1 including safety means to turn off said electric motor when said lid has reached its open and closed positions.

4. The motorized assist assembly claimed in claim 1 including a pair of switch means for energizing said electric motor, said switch means being of the type requiring manual pressure during operation of said motor, said switches being mounted on said housing in positions requiring the use of both of the operator's hands.

5. The motorized assist assembly claimed in claim 2 including safety means to turn off said electric motor when said lid has reached its open and closed positions.

6. The motorized assist assembly claimed in claim 5 including a pair of switch means for energizing said electric motor, said switch means being of the type requiring manual pressure during operation of said motor, said switches being mounted on said housing in positions requiring the use of both of the operator's hands.

7. The motorized assist assembly claimed in claim 6 including an enclosure cabinet for said vertical framework, said carriage and said motorized means, said enclosure cabinet constituting a continuation of said housing, said enclosure cabinet having a vertical panel extending above said housing upper surface, said lid supporting arms extending through vertical slots in said vertical panel.

8. The motorized assist assembly claimed in claim 7 wherein said lid has forward and rearward ends, sides and a top, a shaft affixed to and extending between said arms and extending parallel to and adjacent said lid rearward end, hinge means on said lid rearward end pivotally attach to said shaft, said lid being pivotable with respect to said arms and about said shaft between a vertical position and said horizontal position, means on said lid and arms determining said horizontal position of said lid.

9. A motorized assist assembly for raising and lowering the lid of a large capacity pressure cooker, said assembly comprising a large capacity pressure cooker having a housing with an upper surface, a cooking vat mounted within said housing and having an open upper end projecting upwardly from said housing upper surface, means within said housing to heat said vat, a lid for said vat, said lid being shiftable between an upper horizontal open position and a lower horizontal closed position, means mounted within said lid for sealingly engaging said vat upper end, latch means on said lid and said housing for locking said lid in said closed position, a pair of parallel horizontal arms to either side of and supporting said lid, said housing having sides, and forward and rearward ends, a vertically oriented rectangular framework affixed to said housing rearward end, a portion of said rectangular framework extending above said housing upper surface, said framework comprising a pair of vertical guide rails joined at their top and bottom ends by upper and lower horizontal frame members respectively, a cabinet enclosing said framework, said cabinet having a front panel extending above said housing upper surface, a vertically oriented carriage mounted within said framework, said carriage having vertical sides, rollers mounted on said carriage sides and engaging said vertical guide rails of said framework, said carriage being shiftable vertically within said framework, said lid supporting arms being affixed to said sides of said carriage, said cabinet front panel having vertical slots through which said lid supporting arms extend, and a motorized means within said cabinet to shift said carriage within said framework between an upper lid-open position and a lower lid-closed position.

* * * * *